United States Patent [19]

Andre et al.

[11] Patent Number: 4,747,458

[45] Date of Patent: May 31, 1988

[54] PROCESS FOR THE CONTROL OF ACTIVE MOVING BODY RELATIVE TO A LOCAL PASSIVE ENVIRONMENT WITH THE AID OF LOCAL PROXIMETRIC TRANSDUCERS

[75] Inventors: Guy Andre, Rennes; Bernard Espiau, Laille, both of France

[73] Assignees: Commissariat a l'Energie Atomique, Paris; Inria, Chesnay, both of France

[21] Appl. No.: 931,979

[22] Filed: Nov. 24, 1986

Related U.S. Application Data

[63] Continuation of Ser. No. 749,549, Jun. 27, 1985, abandoned.

[30] Foreign Application Priority Data

Jun. 27, 1984 [FR] France ................................ 84 10156

[51] Int. Cl.$^4$ ........................... B62D 5/04; B62D 1/24
[52] U.S. Cl. ..................................... 180/79; 180/168; 901/9
[58] Field of Search .................... 901/9, 35, 34, 46, 47; 180/79, 131, 168, 167, 169; 364/424, 436, 439, 432; 73/432.1

[56] References Cited

U.S. PATENT DOCUMENTS 3,888,362 6/1975 Fletcher et al. ........................ 901/9
4,500,970 2/1985 Daemmer ............................ 180/168
4,588,041 5/1986 Tsuchihashi ........................ 180/168

OTHER PUBLICATIONS

Asakawa, "A Robot with Optical Position Feedback", 1982, pp. 1276-1281.
Affinito, "Computer Controlled Robot with Ultrasonic Sensor", Jan. 1976, pp. 2665-2667, IBM Technical Disclosure Bulletin.

Primary Examiner—Stewart J. Levy
Assistant Examiner—Robert R. Raevis
Attorney, Agent, or Firm—Oblon, Fisher, Spivak, McClelland & Maier

[57] ABSTRACT

The object of the present invention is to greatly simplify the final control of a sensitive, active robot moving in a passive environment. It consists of equipping the robot with a plurality of directional proximetric transducers $C_i$, to which are allocated, for a given operating mode, virtual elementary actions making it possible to determine a control vector of the different actuators (4.1-4.2) responsible for the robot movements. The virtual elementary action allocated to each sensor is weighted by a virtual mass or coefficient $m_i$. The center of gravity of the virtual masses $m_i$ preferably coincides with the control frame of the robot. The invention is more particularly usable in robotized remote manipulation.

8 Claims, 4 Drawing Sheets

PROCESS FOR THE CONTROL OF ACTIVE MOVING BODY RELATIVE TO A LOCAL PASSIVE ENVIRONMENT WITH THE AID OF LOCAL PROXIMETRIC TRANSDUCERS

This application is a continuation, of application Ser. No. 749,549, filed June 27, 1985 now abandoned.

The present invention relates to a process for the control of the movements of a sensitive, active moving body relative to a local passive environment, with the aid of local proximetric transducers. It relates to the field of robotics.

The term "sensitive, active moving body" is understood to mean any moving body equipped with external proximetric transducers sensitive to the presence of objects in the local environment of the moving body, which is also equipped with actuators able to move the moving body within said environment, in order to accomplish a remotely controlled or programmed task, whilst at all times taking into account objects located in the local environment of the moving body. Thus, the present invention applies in non-limitative manner to a mechanical gripper (robotized gripping means claw), a vehicle for intervening in an environment hostile or inaccessible to man, etc.

These sensitive, active moving bodies can also be equipped with internal transducers, which are more particularly sensitive to the influences of the internal state and the useful load transported. These transducers can be position, velocity, torque or force transducers.

The present invention essentially relates to the control of the movements of a moving body with the aid of information supplied by external transducers, the acceptance of information supplied by internal transducers taking place in [per se] known manner and not forming part of the present invention. In the remainder of the description, the word "transducer" consequently refers solely to the external transducers of the moving object.

In the state of the art, the control of sensitive, active moving bodies within a given environment presupposes either the specific materialization of this environment (which is e.g. the case with a vehicle following a line marked on the ground), or an exhaustive modelling of said environment.

The first case is obviously inapplicable when the environment is inaccessible and in more general terms when the path to be followed cannot be established in advance. Moreover, it imposes the path once and for all, which makes it unsuitable if the environment is evolutionary.

In the case where an exhaustive modelling of the environment takes place, the moving body must be equipped with a computer carrying out necessarily complex operations, the model of the environment changing during the displacement of the moving body within the same.

Moreover, in special cases such as maintaining a vehicle moving at a constant distance from the surface of an object or making a vehicle move at the same speed as another vehicle on a parallel path, it is known to provide control loops which solve these specific problems. This situation is more particularly illustrated in EP-A-O No. 032 393 and DE-A- No. 2 241 682.

However, these very specific solutions cannot be transposed to the general case of a sensitive, active moving body functioning in an environment which is not known beforehand and which may be evolutionary, in accordance with one or more operating modes adapted to the task to be performed, with no other limitations in said modes than the presence of transducers supplying the information necessary for the performance thereof.

The term "operating mode" is here understood to mean any elementary function fulfilled by the moving body. From this standpoint, making a vehicle stay at a constant distance from the surface of an object constitutes an operating mode. In a comparable way, forcing a vehicle to move parallel to the path of another vehicle at the same speed defines two operating modes. An operating mode of another type is the centering of a gripper with respect to the object to be grasped.

It is generally possible to conceive a sensitive, active moving body equipped with transducers connected to actuators by control loops ensuring the operating modes for a particular task to be performed.

However, the complexity of the control loops rapidly becomes very great with the increase in the number of operating modes. Moreover, the addition of a supplementary operating mode to an existing system prejudices the complete system.

The present invention specifically relates to a new control process making it possible, by using transducers of a particular type to work out, on the basis of signals supplied by the transducers involved for a given operating mode, a control instruction or order for the actuators used in this particular operating embodiment, without having recourse to a materialization and/or modelling of the environment.

Another objective of the invention is that of providing a modular system, in which the transducers can be added to or removed from an existing moving body, without prejudicing the complete system.

The present invention therefore specifically relates to a process for the control of the movements of a sensitive, active moving body, moved by at least two actuators, relative to a local, passive environment, in accordance with at least one operating mode, characterized in that it comprises, for each operating mode, using at least two directional proximetric transducers $C_i$, having a given origin mounted at a known location on the moving body and supplying a response depending on the distance x separating the origin of the transducer from an obstacle in the environment, in accordance with a known detection direction with respect to the moving body;

allocating to each transducer $C_i$ a virtual elementary vectorial action $\vec{A_i}$, whose modulus is defined by the relation $A_i = m_i \cdot f(x)$, meaning the euclidean vector norm, $m_i$ being a coefficient constituting a virtual weighting mass of the action of said transducer and $f(x)$ being an increasing monotonic function derived from the response of the transducer to an obstacle placed at distance x, the application point of action $\vec{A_i}$ being in general the origin $M_i$ of transducer $C_i$;

determining on the basis of the thus defined elementary vectorial actions $A_i$, a screw, a control torsor of the actuator, the origin thereof coinciding with the origin 0 of a control frame associated with the actuators, i.e. the frame in which is expressed the control of the system independently of said elementary actions. It should be understood that the term screw and torsor can be used interchangeably.

With respect to the thus defined control process, the following observations can be made. The directional proximetric transducers can either be transducers directly supplying a proximetric signal (infrared, optical, ultrasonic, eddy current or similar transducers) or more complex transducers such as displays, on the basis of which it is possible to obtain after processing a directional proximetric signal. The coefficients $m_i$ are called "virtual weighting masses", because the behavior obtained is then identical to that of a virtual mechanical system formed by punctiform masses $m_i$ rigidly connected by massless bars. The origin $M_i$ of the transducers is determined by the expert, e.g. as a function of the nature thereof, the configuration of the output signal and the type of action which it wishes to ensure. It can e.g. be the origin of the function $f(x)$ derived from the response of the transducer (e.g. $x=0$), or the central point between transmitter and the receiver constituting the transducer. In practice, the function $f(x)$ corresponds to the response of the corresponding transducer, after said response has been processed, in order more particularly to extract therefrom the background noise and linearize the same.

It should also be observed that the process according to the invention is separately applicable to each of the operating modes of the moving body, when the latter has several such modes. This means that the same transducer can be simultaneously involved within the scope of several operating modes of the moving body, the coefficient $m_i$ and the vectorial action $\vec{A_i}$ possibly being different in each of the modes allocated thereto.

In other words, on a moving body equipped with a relatively large number of transducers, each of the operating modes requires the intervention of at least two of the transducers, to which are allocated virtual weighting masses $m_i$ making it possible, on the basis of functions $f(x)$ derived from the responses of said transducers, to determine virtual elementary actions corresponding to a displacement, velocity, an acceleration or a force. For the considered operating mode, these elementary actions make it possible to obtain, e.g. in certain very simple cases by summation, a control instruction for the actuators defining a behavior of the moving body relative to its environment. This behavior can be isolated or superimposed on actions taking place or previously controlled. The control instruction is in the form of a screw. Thus, the moving body is controlled in a coordinated manner, without involving modelling of the environment.

The operating modes of the moving body are determined by an algorithm, which does not form part of the invention. It is this algorithm which determines the transducers involved by the mode, the virtual masses $m_i$ allocated to said transducers and the operation to be performed on the basis of virtual elementary actions allocated to the transducers for producing the control instruction.

In general terms, the coefficients $m_i$ represent the relative importance allocated to each transducer for a given operating mode. In the case where the control screw is dynamic, i.e. when the control quantities are forces and torques expressed in the control mark $R_N$, it is then merely necessary for obtaining said control to calculate the zero reductions elements of the screw associated with the elementary action $\vec{A_i}$ applied to the masses $m_i$:

$$\mathcal{C} = \begin{cases} \Sigma m_i \cdot \vec{A_i} \\ \Sigma m_i \cdot \vec{A_i} \wedge \vec{OM_i} \end{cases}$$

in which $\wedge$ designates the vector product (or cross product).

The control of the system takes place in speed or velocity (kinematic) and if the $\vec{A_i}$ represent the desired velocities or speeds for each mass $m_i$, the above screw can also be used.

In both cases, the best results will be obtained when the control frame coincides with the main inertia frame of the masses $m_i$, i.e. the frame in which the torsor or inertia matrix is diagonal and whose origin is the center of gravity of the masses $m_i$. Then, decoupling will be at a maximum in dynamics and the elementary velocity obtained for points $M_i$ in the kinematic case will be as close as possible to the desired velocities.

In the two particularly interesting embodiments of the invention, determined by the choice of transducers of a particular type, the function $f(x)$ can either be a monotonic function of the distance, either positive or negative and corresponding to an attraction or repulsion, or a function which changes sign for a given distance x corresponding to a remote control. For a given operating mode, function $f(x)$ is preferably the same for each of the transducers.

Moreover, the direction of the elementary action $\vec{A_i}$ is preferably either the same as the detection direction of the corresponding transducers, or perpendicular to said direction. Here again, for a given operating mode, the directions of the action $A_i$ in question are preferably the same.

The invention is described in greater detail hereinafter relative to non-limitative embodiments and with reference to the attached drawings, wherein show.

Figure 1:
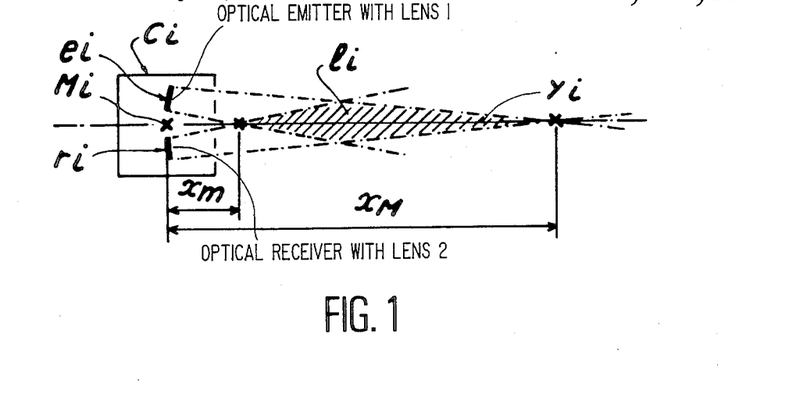
FIG. 1 a basic diagram of an optical proximetric transducer usable in the invention.

FIG. 1 is a basic circuit diagram of a local proximetric transducer $C_i$ usable according to the invention. It comprises a transmission surface $e_i$, e.g. ultrasonic or light, and a reception surface $r_i$ receiving a return signal from a target, e.g. the ultrasonics reflected or the light diffused by said target. The intersection of the angular conic transmission and reception fields of surfaces $e_i$ and $r_i$ defines a lobe $l_i$, hatched in FIG. 1, whose axis $y_i$ is consequently the detection direction of the transducer. For example, the origin $M_i$ of the transducer which is chosen is the point of axis $Y_i$ located between the transmission $e_i$ and reception $r_i$ surfaces. In known manner, the transducer has a practical minimum range $x_m$ and a maximum range $x_M$, given by the geometrical characteristics of the sensitive fields definite by the lenses, and by the photometric properties of the optical components.

On the basis of the signals supplied by proximetric, directional transducers of this type (or similar transducers), the process according to the invention makes it possible to control the behavior of a moving body in accordance with one or more given operating modes, with respect to the local environment of the moving body, i.e. within the range limits of the transducers.

With this aim in mind, to each transducer $C_i$ is allocated a coefficient $m_i$ constituting a virtual weighting mass of the action of the transducer. Then, to said transducer is allocated for the operating mode in question, a virtual elementary action, e.g. in the form of a force $f = m_i f(x)$, $f(x)$, which is directly derived from the response of the transducer when an object is at distance x, following processing aiming at eliminating the background noise and e.g. linearizing said signal. This function f(x) can be in particular be in form $1/x$ or $1/x^2$. Force f is applied to the origin $M_i$ of the transducer and in a direction coinciding with the detection direction thereof or perpendicular thereto.

In practice, the geometrical dimensions of the elements of the transducers have such low values with respect to the values of the dimensions of the moving body or the environment that it is possible, for the realization of the invention, to accept the approximation of considering that the origin $M_i$ of the transducer $C_i$ coincides with a central point of the physical location of the transducer mounted on the moving body.

Figure 2:
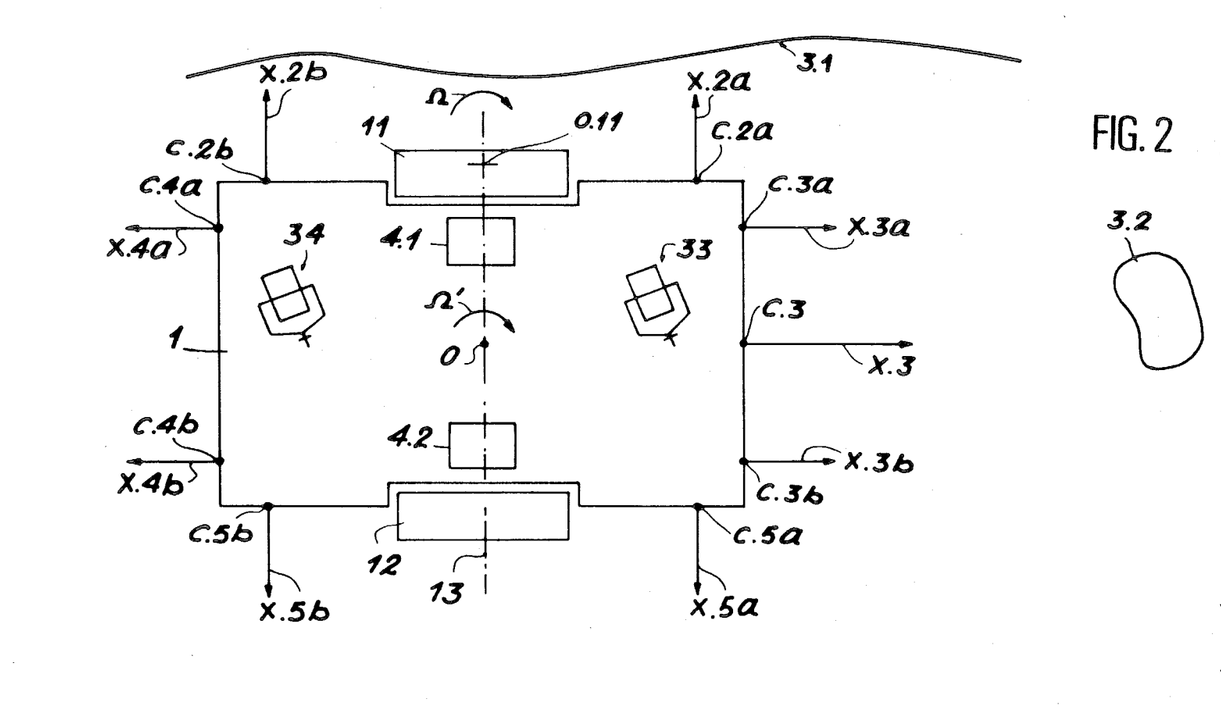
FIG. 2 diagrammatically shows the way in which it is possible to equip with proximetric transducers a vehicle moving on the group, so that it can be controlled by the process according to the invention.

FIG. 2 diagrammatically shows a moving vehicle 1 moving on a surface, e.g. the ground, and having 2° of freedom on the ground materialized by two wheels 11, 12, controlled by respective actuators 4.1 and 4.2, said two wheels being carried by a single axle 13. Idle wheels 33, 34 ensure the stability of said vehicle, which can be practically realised in the form of a wire-guided carriage or trolley, a motorized chair for handicapped people, or certain small electric cars.

It should be noted that vehicles of the aforementioned type generally have the axle 13 towards the rear, whereas FIG. 2 shows a symmetrical position of the axle for clarity of explanation purposes. It should also be noted that vehicle 1 is strictly equivalent to a vehicle having two caterpillars on the lateral faces, except that such caterpillars lead to a high degree of friction when rotated at different speeds and which is prevented here by the idle wheels 33, 34.

On considering vehicle 1 stopped in the vicinity of a wall 3.1, it can be seen that any movement of wheel 12 leads to a pivoting of the vehicle about a contact point 0.11 with the ground of wheel 11, or of the contact center of the left-hand caterpillar of the vehicle. Thus, any differential action between wheel 12 and wheel 11 can be brought to the center (e.g. 0.11) of a kinematic screw, about which the vehicle is rotated.

According to the invention, this vehicle has been equipped on its left-hand face (at the top in FIG. 2) with two proximetric transducers c.2a and c.2b, in this case arranged symmetrically with respect to axle 13.

According to the invention, with the signals X.2a and X.2b from the two transducers c.2a and c.2b are associated virtual elementary actions colinear with the detection direction, which are applied to the origin of the transducers and whose each modulus is given by the relation $A = m \cdot f(x)$, which m is a coefficient allocated to the corresponding transducer and in which f(x) corresponds to X.2a and to X.2b for transducers c.2a and c.2b.

In the case shown in FIG. 2, transducers c.2a and c.2b are arranged symmetrically with respect to the center 0.11 of the control mark of actuator 4.2, which is the only one taken into consideration in this operating mode. The coefficients $m_i$ associated with the transducers are consequently identical, so that the virtual elementary actions in practice correspond to the responses of transducers c.2a and c.2b.

When the virtual elementary actions are different, on the basis of their difference a rotation order $\Omega$ about 0.11 is determined. This rotation $\Omega$ is obtained at the actuators in the form of a differential displacement of wheel 12 relative to wheel 11, no matter whether this is considered in displacement on stopping, in force or in superimposed manner with a vehicle cruising speed. In this operating mode, there is consequently a so-called "straightening" action, in the sense that by acting via the control so as to equalize actions A.2a and A.2b, the left-hand face of the vehicle is made parallel to the line corresponding to the surface to be followed on wall 3.1.

In other words, by combining the two elementary actions A.2a and A.2b, so as to control the two transducers c.2a and c.2b at fixed distances, a combined straightening action is obtained in the form of pivoting.

On equipping vehicle 1 with two transducers c.3a and c.3b, which face the front, it is possible to introduce a new operating mode of the vehicle. According to this, any difference between signals X.3a and X.3b from the two transducers C.3a and C.3b makes it possible to control a centering action on an object 3.2. For this purpose, the elementary action associated with each of the two transducers C.3a and C.3b is no longer colinear to the detection direction and is instead substantially perpendicular. The difference between these two virtual elementary, opposed actions makes it possible to produce a vehicle rotation order.

It may be more appropriate in this case to consider the differential effect of the two wheels 11, 12, no longer relative to the contact point 0.11 of wheel 11 with the ground, but about the center 0 of axle 13, taken as the apex of the control mark of actuators 4.1 and 4.2. Here again, the coefficients $m_i$ associated with transducers C.3a and C.3b are the same. The difference between the virtual elementary actions associated with transducers C.3a and C.3b consequently makes it possible to control a rotation about point 0, no matter whether at stop or in superimposed form on the preestablished path of moving body 2.

In a first mode, if object 3.2 in front of vehicle 1 is considered as a target, the directions of the elementary actions will be opposed, so as to center vehicle 1 on object 3.2. If in another mode, said object 3.2 is considered as an obstacle, the directions of the elementary actions will be identical, in order to control a bypassing path initialized on the side of the strongest signal.

It is clear that actions of a colinear nature or a perpendicular nature can be interchanged and that the same set of transducers can be allocated to different elementary actions, as a function of the circumstances and the chosen operating modes.

It is also clear that in a centering operating mode, it is possible to simultaneously, using the same transducers C.3a and C.3b, superimpose a remote control operating mode and consequently bring about the stopping of the vehicle at the desired distance from a target, or the tracking of said target if it is mobile, provided that the speed capacity limits of the two moving bodies are compatible.

There is a free choice of the working frame in which will be resolved the combinations of the elementary actions associated with each transducer. However, depending on whether this choice is here related to a frame of apex 0.11 or 0, a change of coordinates may have to be carried out in order to bring about coincidence between the actions requested by the transducers and which can effectively be performed by combinations of actuators.

Thus, the essential advantage of the invention is that by choosing the locations of the transducers and their number, together with their coefficients $m_i$, it is possible to optimize the control instructions associated with the transducers, in such a way that they best correspond to the effective control permitted by the actuators.

In the hitherto described embodiments, it is possible to obtain a virtually direct control. However, as will be seen hereinafter, this case is exceptional.

FIG. 2 illustrates a much more complex case relating to a moving body 1, which can be the gripping means of a robot acting by the movements of its articulated arm. Under these conditions, it can be seen that the transducers C.2a and C.2b make it possible to carry out a tracking of wall 3.1 using the straightening action, whilst the front transducers C.3a and C.3b either get round obstacle 3.2, or center it and/or stop at a fixed distance with respect to said obstacle. Transducer C.2a alone makes it possible to follow wall 3.1 or moving towards the right of FIG. 1, but does not make it possible to fulfill this function in the opposite direction, where it is carried out by transducer C.2b, [so that the combined action of the two transducers C.2a and C.2b has no polarity]. It should also be noted that transducers C.3a and C.3b only exercise their functions towards the front of vehicle 1 and that omnidirectional operation requires that the same vehicle is equipped with rear transducers C.4a and C.4b supplying proximetric signals X.4a and X.4b. By symmetry, lateral transducers C.5a and C.5b supplying proximetric signals X.5a and X.5b can complete the symmetry of the arrangement of transducers, thus permitting the most complete control.

It can be considered that the actions associated with the lateral or front transducers, during the operating mode involving avoiding obstacles, lead to the transmission to the actuators of a pivoting control instruction $\Omega' = k(V_{11} + V_{12})$ and a longitudinal speed control instruction $S = k'(V_{11} + V_{12})$, $V_{11}$ and $V_{12}$ being the speeds of wheels 11 and 12 respectively and k and k' are coefficients varying with the amplitude of the actions to be performed.

According to the invention, these control instructions are obtained by applying to point 0 constituting the apex of the working or control mark, the action $\Sigma m_i \overline{A_i}$ and, $\Sigma m_i \overline{OM_i} \wedge \overline{A_i}$, $m_i$ being the virtual mass or coefficient allocated to the transducer $C_i$, $\overline{A_i}$ being the action associated with the same transducer, here expressed in terms of speed, and $M_i$ being the origin of the transducer $C_i$. If necessary, the control instructions of the actuators can be made clear for this purpose by a control device using a change of coordinates.

Figure 3:
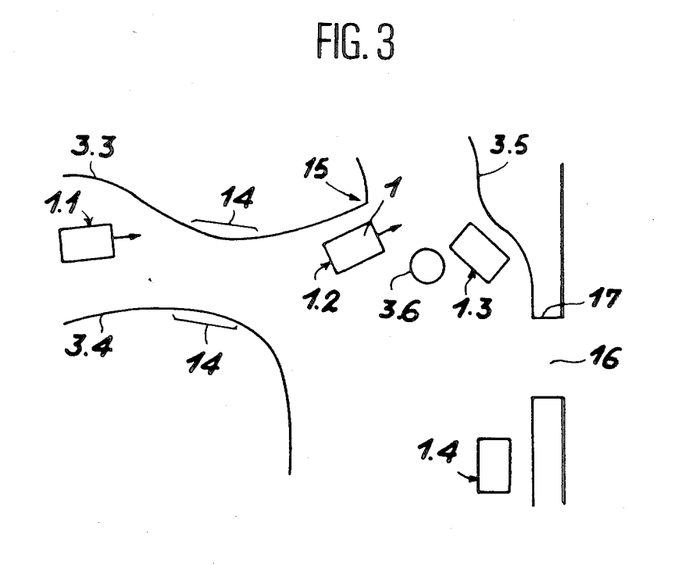
FIG. 3 an example of a path followed by the moving vehicle equipped in the manner shown in FIG. 2.

FIG. 3 shows how the control process according to the invention and the different operating modes which can be applied thereto constitute a high flexibility solution during the displacement of the moving body 1 of FIG. 2 into a complex environment.

FIG. 3 shows the initial position 1.1 of vehicle 1 to the left between walls 3.3 and 3.4 constituting obstacles and having in particular a narrowing zone 14. The vehicle, which is assumed to be moving according to a parallel tracking mode of left-hand wall 3.3, on approaching the narrowing zone 14 will detect the appearance of wall 3.4 to its right and can, by checking the signals from its front and rear transducers, establish that it is possible to pass through this narrow zone with tighter instructions concerning the data which must not be exceeded in lateral distance. This operating involves the superimposing of at least one operating mode on the preceding mode, in which the right-hand wall 3.4 constitutes an obstacle to be avoided. If the narrow zone 14 is too narrow, the vehicle cannot pass through and can carry out a half-turn or reverse, in accordance with predetermined operating instructions.

However, on assuming that the vehicle has passed through the narrow zone 14, it can then be controlled either to follow the right-hand wall 3.4, or the left-hand wall 3.3, according to the chosen operating mode. In the latter hypothesis, if it arrives at angle 15 in position 1.2, vehicle 1 will note a sudden variation in the signal from the left-hand front transducer (FIG. 2). This type of situation must be transmitted to the operator, or to a higher control level, which establishes the fact that the presence in front of the vehicle of a wall 3.5 detected by a front signal gives the choice of either turning to the left, or of jumping the discontinuity of the gap 3.3-3.5 and then following wall 3.5. In the latter case, the presence of an obstacle 3.6 can be accepted, so that the vehicle bypasses said obstacle on the best side. Finally, when the vehicle reaches position 1.3, it will know by an instruction from the operator or through the knowledge of its environment that the discontinuity or gap in wall 16 is a door. In accordance with instructions determined by preestablished operating modes or chosen by the operator, the vehicle can directly follow the entrance angle of said door 17, or can pass in front of it continuing its path to position 1.4.

Thus, the control process according to the invention makes it possible to create a behavior function "avoidance of front obstacle followed by wall" without it being necessary to define the shape and/or displacement of these obstacles. Only sudden variations, whose amplitude exceeds the range of the proximetric transducers carried by the vehicle, such as angles 15, 17 and opening 16, escape from the control according to the invention.

The nature of these sudden variations must consequently be known beforehand to enable complex tasks to be performed and to give decision elements relative to said point to an operator who remotely controls the vehicle, or to an autonomous decision system. Thus, for describing to vehicle 1 in the initial position 1.1 the task consisting of entering by door 16 whilst obviating all fixed or moving obstacles along the route, it is merely necessary to indicate that the angle to the left 15 does not have to be followed and that it is necessary to follow the same wall to turn to the left at the second gap.

This makes apparent an essential advantage of the invention, whose control process makes it possible to ensure a precise positioning of a moving body in its local environment, or a "self-adaptation" of the moving body to said local environment, the overall environment in which the moving body is to function only being known in general terms (e.g. large gaps or discontinuities) in the form of a "fuzzy model". This fuzzy or blurred model obviously has nothing in common with the exhaustive modelling of the environment which was generally carried out in the prior art.

The fictitious weighting masses or coefficients $m_i$ allocated to the different transducers $C_i$ involved by each of the operating modes of the moving body are chosen so as to place their center of gravity, defined by the relation $\Sigma m_i \cdot \overline{OM_i}$ on one of the axes of the mark on the moving body of the speed torsor in FIG. 2, said characteristics being applicable to pairs of transducers C.3a–c.3b, C.2a–C.2b, as well as for the following pairs. Moreover, as moving body 1 is provided with all its transducers $C_i$, the main inertia axes corresponding to the fictitious weighting masses or coefficients $m_i$ of the actions of each transducer coincide with the axes of the control mark of apex 0 linked with the actuators of moving body 1.

Figure 4:
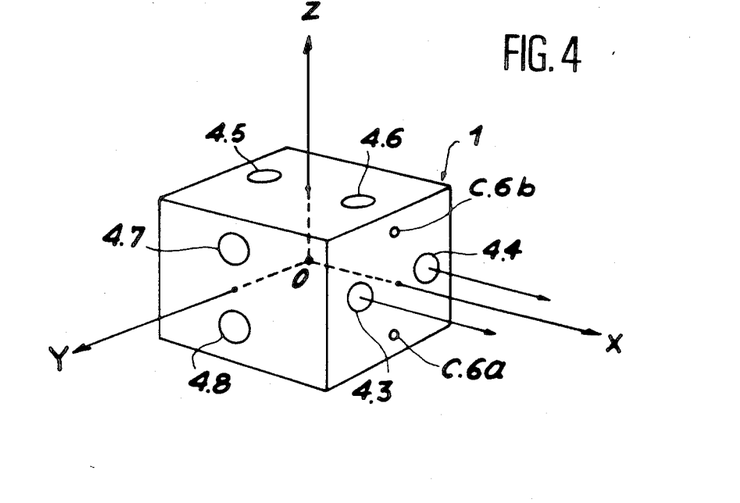
FIG. 4 the application of the invention to a vehicle moving in a 3-dimensional space.

FIG. 4 shows a moving body 1, in cubic form, floating in the medium constituting its environment. This situation corresponds to that of a moving body floating in a liquid of the same density and which then also has an immaterial position (center of gravity coinciding with the center of floatability). This situation also corresponds to a moving body in a non-gravity position on an orbit and not propelled in space, the reference mark being a mark linked with said orbit.

On e.g. assuming that it is a submarine means, FIG. 4 shows a moving body having a mobility with six degrees of freedom. This mobility is obtained with the aid of two tunnelled propellers 4.3 and 4.4 acting in accordance with a major axis OX, two similar propellers 4.5 and 4.6 ensuring the propulsion along an axis OZ and finally two propellers 4.7 and 4.8 ensuring the mobility along an axis OY, axes OX, OY and OZ being orthogonal to one another. It can be seen that this vehicle can be propelled by a force vector along OX for equal thrusts of the two propellers 4.3 and 4.4 and can carry out a pure rotation about OZ for opposite thrusts of the same propellers, and so on for the three axes. Thus, a moving body is obtained, whereof the combinations of actions of the propellers directly offer a cartesian form of torsor of forces exerted on its center of gravity 0 in the reference mark OXYZ.

According to the invention, proximetric transducers, whose detection takes place in the axis of each of the propellers are placed on the moving body. Then, to each transducer is allocated a virtual action in the form of a force opposite to the response of the transducer, of form $f = m/X^2$ or a similar function. On the basis of these virtual actions, control instructions are determined, which correspond to a behavior which, as a function of the sign of forces colinear to the detection directions of the transducers (determined by the chosen operating mode or modes), makes it possible at the same time to avoid any obstacle on each of the faces in question and any tracking parallel to surfaces on each of its faces.

Preferably there are at least four transducers per face, the transducers whose detection directions do not coincide with the axes of the propellers are then allocated actions perpendicular to these directions and ensure the control of the propellers of the adjacent face. Thus, two transducers C.6a and C.6b mounted on the right-hand front face in axis OX can be used for determining the control instructions of propellers 4.5 and 4.6 and so on.

The very diagrammatic representation of FIG. 4 makes it possible to understand that the inertia ellipsoid associated with the fictitious masses $m_i$ allocated to each transducer is centered on apex 0 of the control mark OXYZ associated with the actuators.

It is readily apparent that the vehicle of FIG. 4 is blind out of the field of its different transducers. The addition of transducers in diagonal planes can complete its capacity to detect obstacles in the complete solid angle surrounding it. A local control using proximeters installed on the moving body can consequently be obtained using all useful combinations of actions liable to produce a self-adaptation behavior for avoiding obstacles and/or straightening (tracking parallel to a surface, or any target tracking in any direction).

Figure 5:
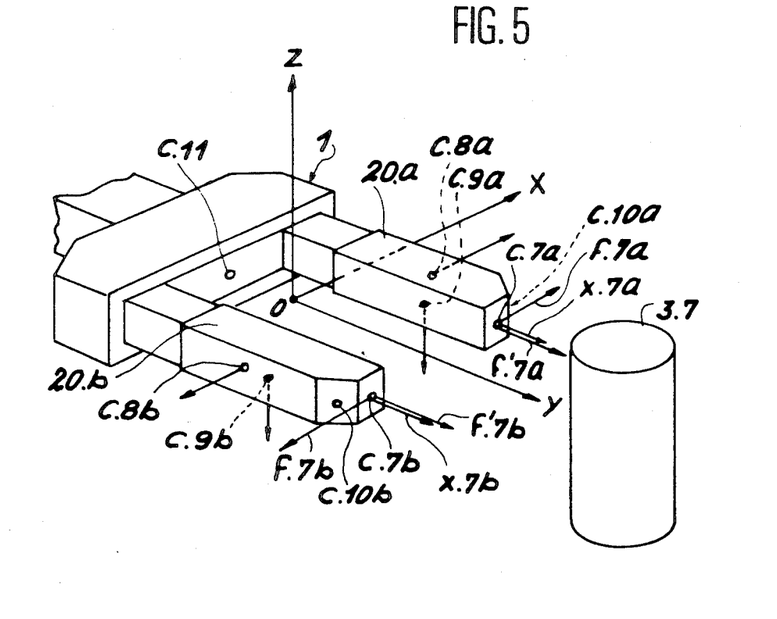
FIG. 5 the application of the invention to a gripper of a manipulator.

The aforementioned embodiments have illustrated elementary application forms of the invention and this will be even better understood by means of FIG. 5.

FIG. 5 shows a moving object 1, which is in this case the gripper of a manipulator, whereof the effector is shown and which is equipped, according to the invention, with proximetric transducers for carrying out a closed loop control with respect to the different objects surrounding said mobile gripping means, said transducers being e.g. infrared transmission proximeters. The latter transmit a narrow light pencil and when this light encounters a sufficiently close surface, it returns by reflection and mainly by diffusion part of said light to a photoreceiver very close to the transmitting diode. The output signal of such a transducer is e.g. in form $1/x^2$, x being the distance between the transducer and the surface. This form obviously gives the idea of a gravitational or magnetic force.

Within the scope of the invention, gripping means 1 is equipped with a certain number of proximetric transducers. In particular, the proximetric transducers C.7a and C.7b located in the vicinity of fingers 20.a and 20.b of the gripping means are directed forwards in a direction OY for supplying signals X.7a and X.7b making it possible to detect an object 3.7 to be grasped.

In a first, so-called centering operating mode, the two signals X.7a and X.7b from transducers C.7a and C.7b are used in differential manner, the coefficients $m_i$ then being identical, so as to produce an operating instruction in a direction OX approximately perpendicular to direction OY common to the two transducers. FIG. 5 shows these two actions in the case where object 3.7 in the form of respective forces f.7a and f.7b is approximately perpendicular to the detection directions of the transducers. It is pointed out that these two forces have a resultant tending to bring about a leftward displacement of the gripping means 1, i.e. exert a centering action with respect to object 3.7. This resultant is applied in the plane tangential to the front of the gripping means. The thus obtained differential signal constitutes a control instruction, which is supplied to the manipulator control system. The latter then displaces the gripping means parallel to said force, which has the effect of bringing the gripping means in front of the object 3.7 to be grasped. If object 3.7 is outside the range of transducer C.7b, but within the range of transducer C.7c only, force f.7a determines a control instruction tending to bring the gripping means 1 towards said object 3.7. If object 3.7 is outside the range of the two transducers, it has no influence on the gripping means, because no control instruction is transmitted.

The action of the elementary forces associated with transducers C.7a and C.7b can either lead to a displacement of the gripping means parallel to itself along OX, or to a pivoting of the gripping means about axis OZ, i.e. by orientation variation of the gripping means. Moreover, the change of sign of these elementary forces amounts to passing the object from the target to the obstacle and corresponds to an avoidance mode. The apex 0 of the control mark linked with the gripping means has voluntarily been placed here in the center of the active zone of the gripping means in the center of the two fingers 20a, 20b.

Another control mode, according to the control system according to the invention, on the basis of said same two transducers C.7a and C.7b leads to the allocation to the transducers of two forces f'.7a and f'.7b, on this occasion colinear to the detection directions of the transducers. These two forces produce a new resultant action which, as a result of the different responses of the two transducers, makes the gripping means pivot about axis OZ, or leads to its advancing along axis OY. If the control force obtained from forces f'.7a and f'.7b tends towards zero and is inverted on either side of a distance taken as the reference, the gripping means is made to be at a given distance from object 3.7 and in its plane of symmetry seen by the transducers C.7a and C.7b. The first function was a centering function, whilst the second is a position control function, which can be extended to a straightening function with respect to the surface observed by the transducers.

The elementary functions which, according to the invention, can be allocated to the first two transducers C.7a and C.7b consequently make it possible to effect a sophisticated centering and straightening function with respect to the object 3.7, prior to its grasping by gripping means 1.

Obviously, the gripping means 1 equipped with transducers according to the invention can have a more sophisticated behavior and, when it is seeking its target 3.7, must be able to avoid obstacles liable to prejudice this search. Therefore, it is equipped with at least one pair of transducers C.8a, C.8b on the outer lateral faces of fingers 20.a and 20.b and transducers C.9a and C.9b placed below said fingers, in order to avoid lateral obstacles and the surface of the table on which object 3.7 can be placed.

Gripping means 1 is also equipped with transducers C.10a and C.10B, which are able to avoid obstacles close to the object 3.7 towards the front of the gripping means.

Gripping means 1 also has at least one transducer C.11 which, between the fingers, faces the object to be grasped. Transducer C.11 can be single or multiple, ensuring the actual grasping function until the object 3.7 is in the vicinity of apex 0 of the control mark OXYZ of gripping means 1.

By allocating, according to the invention, each transducer $C_i$ with an action $A_i$ and an elementary mass $m_i$, it is clear that it is important for the resultant actions to be easily formed in a screw of apex 0, which is easily brought about if the center of gravity of these fictitious masses is at zero.

In passing, it should be noted that the closing action of the fingers occurring after any approach phase, the transducers being located on said mobile fingers relative to the body of the gripping means 1, in no way affects the operation of the sytem during the approach phase.

Thus, the control process according to the invention makes it possible to determine, on the basis of elementary actions allocated to the transducers and for each operating mode, a force and a torque. According to the operating mode, said force results from elementary forces colinear or perpendicular to the detection directions of the corresponding proximetric transducers. This leads to a torque and a force in the control frame OXYZ. When the response of these transducers is $1/x^2$, the force exerted on moving body 1 is of the pseudogravitational type as a function of the responses of the transducers facing the objects encountered in their environment, whereby said objects can be seen as positive or negative, depending on whether they are sought targets or objects to be avoided.

The control obtained by such a process is of a dynamic nature. Thus, in the present state of the art, it is not always applicable in a simple way, due to the present unavailability of sufficiently sophisticated robot control devices. Thus, in a second application level of the invention, the aforementioned gravity center criterion will be explained by a stronger condition amounting to determining the main inertia axes resulting from the different fictitious masses allocated to the transducers.

Thus, in its most evolved form, the invention consists of choosing as the control or working mark $R_N$ (linked with the solid or moving body), the main inertia mark of the virtual masses $m_i$. The expressions:

$$s = \Sigma m_i \vec{A_i}$$

$$\omega = \Sigma m_i \overrightarrow{O_N M_i A_i}$$

in which $\vec{A_i}$ is the action exerted at $M_i$, $O_N$ is the origin of the mark $R_N$, $m_i$ the virtual weighting mass or coefficient chosen such that $\Sigma m_i = 1$, can be used for determining as required, both the dynamic control screw s (the fictitious forces to which the solid is subjected) and the $\omega$ kinematic torsor (speed references).

These screws constituting control instructions are then automatically defined by their reduction elements in $O_N$ and expressed in the mark $R_N$.

The effective control is then calculated in joint space by means of the Jacobean transforming linking the generalized velocities or forces (dependent on the location of the moving body actuators) with the screws expressed in the mark $R_N$. This latter part is independent of the determination of the control screws from the actions allocated to the transducers. In certain cases, a particular arrangement of the actuators merely amounts to simplifying said change of coordinates.

Figures 6, 7, 8, 9:
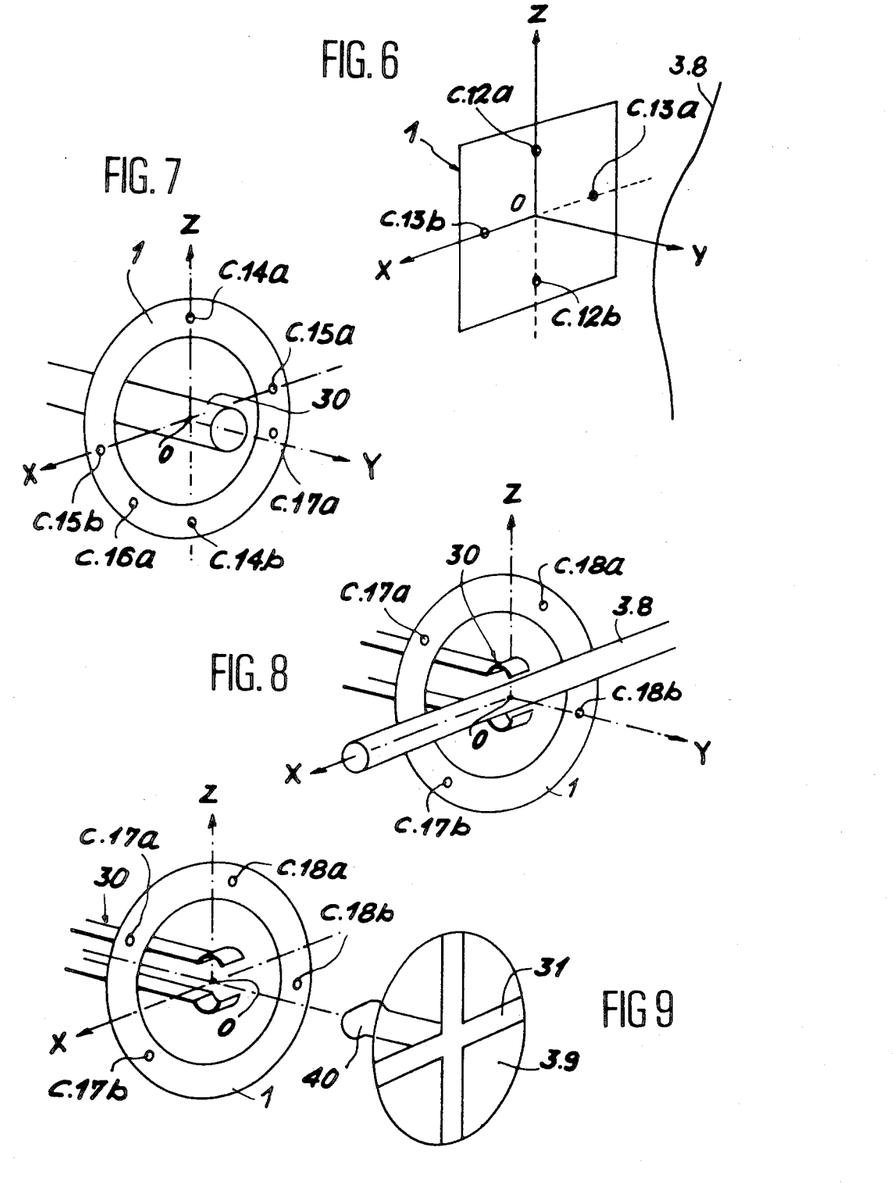
FIGS. 6 to 9 the application of the invention to other controls performed in a 3-dimensional space.

Reference will now be made to FIG. 6, which also shows an elementary application case of the control process with the aid of local proximetric transducers according to the invention. A moving body 1, here shown as a square, has two pairs of transducers C.12a–C.12b and C.13a–C.13b, positioned symmetrically with respect to point 0 and on axes OZ and OX located in the plane of the moving body and constituting with a final axis OY a trihedron OXYZ. This system permits the realization of a distance controlled tracking function and also a straightening function in space. This second function is brought about by rotating the moving body about axis OZ controlled from a pair of transducers C.13a and C.13b and by the rotation of the moving body about axis OX controlled from the pair of transducers C.12a and C.12b. The average distance from an obstacle derived from the response of these four transducers makes it possible to make the moving body 1 remain at a rated mean distance from the surface 3.7. It is such a system which is designated at C.11 in FIG. 5 and makes it possible to bring about a straightening of the complete gripping means 1, with respect to the front surface of the object to be grasped 3.7.

Reference will now be made to FIG. 7, which illustrates an application case of the invention extending the case of FIG. 6. In this case, a ring 1, traversed by an effector member 30, is, according to the invention, equipped with four proximetric transducers C.14a, C.14b and C.15a, C.15b. The pair of transducers C.14a and C.14b can be used for controlling a rotation of ring 1 about axis OX, or a displacement of the ring parallel to the axis OY. In the same way, the pair of transducers C.15a, C.15b can be used for controlling a rotation of the ring about axis OZ, or a displacement of the ring parallel to axis OY. In practice, it is only possible to use three transducers for obtaining these actions, said transducers being located at C.14a, C.16a and C.17a at the apices of an equilateral triangle. The interest of such a multiplyer ring is to make it possible to obtain a supplementary orientation function about axis OY.

Reference will now be made to FIG. 8 for illustrating an application case of the invention in the extension of the case of FIG. 7. According to FIG. 8, the target 3.8 is linear and is e.g. materialized by a tube. The effector member 30 is e.g. a claw or shear centerd along OZ and also oriented in such a way that OX is parallel to tube 3.7. For this purpose, on ring 1 associated with claw 30, are placed transducers C.17a and C.17b used in the differential centering mode dependent upon an appropriate distance of target 3.8. In the same way, transducers C.18a and C.18b also placed on ring 1 are used in a differential centering mode dependent on the same distance of target 3.8.

As illustrated in FIG. 9, this type of ring 1 with four proximetric transducers C.17a, C.17b, C.18a and C.18b makes it possible to center and orient its effector member 30 on a target 3.9 marked by a cross 31 on its surface. This is followed by a straightening and distance control, as well as the orientation of member 30 relative to the cross. This arrangement can be used in order to control the interception of the gripping member 40 carried by a moving body 3.9, such as a satellite.

The invention is obviously not limited to the special embodiment described. It has in fact a very general application, as defined at the beginning of the description and in the claims.

We claim:

1. Process for control of the movements of a sensitive, active moving body, moved by at least two actuators, relative to a local, passive environment, in accordance with at least one operating mode, characterized in that it comprises, for each operating mode, using at least two directional proximetric transducers $C_i$, having a given origin mounted at a known location on the moving body and supplying a response nearly representing the distance x separating the origin of the transducer from an obstacle in the environment, in accordance with a known detection direction with respect to the moving body;

allocating to each transducer $C_i$ a virtual elementary vectorial action $\vec{A_i}$, whose modulus is defined by the relation $\vec{A_i} = m_i \cdot f(x)$, $m_i$ being a coefficient constituting a virtual weighing mass of the action of said transducer and f(x) being an increasing monotonic function derived from the response of the transducer to an obstacle placed at a distance x, the application point of action $\vec{A_i}$ being the origin $M_i$ of transducer $C_i$;

determining on the basis of the thus defined elementary vectorial actions $A_i$, a control screw of each actuator, the origin thereof coinciding with the origin 0 of a control frame associated with the actuators.

2. Process according to claim 1, characterized in that the coefficients $m_i$ allocated to each of the transducers $C_i$ are chosen in such a way that their center of gravity 0 defined by $(\Sigma m_i \times OM_i)$ coincides with the origin 0 of the control frame of the moving body.

3. Process according to claim 1, characterized in that the coefficient $m_i$ allocated to each of the transducers $C_i$ are chosen in such a way that they define a main inertia mark coinciding with the control mark of the moving body.

4. Process according to one of the claims 1 to 3, characterized in that the function f(x) is a monotonic function of the distance, always positive or negative, corresponding to an attraction or repulsion.

5. Process according to one of the claims 1 to 3, characterized in that the function f(x) is a function which changes sign for a given distance of transducer $C_i$ relative to the detected environment, corresponding to a distance control.

6. Process according to claim 5, characterized in that the elementary action direction $A_i$ coincides with the detection direction of transducer $C_i$.

7. Process according to claim 5, characterized in that the elementary action direction $A_i$ is perpendicular to the detection direction of transducer $C_i$.

8. Process according to claim 7, characterized in that, for each operating mode, the function f(x) and the elementary action directions $A_i$ are the same for each of the transducers $C_i$.

* * * * *